United States Patent [19]

Johnson

[11] Patent Number: 4,825,294

[45] Date of Patent: Apr. 25, 1989

[54] ANTI-FLARING VIDEO OUTPUT AMPLIFIER CIRCUIT AND TECHNIQUE

[75] Inventor: Fred D. Johnson, Evanston, Ill.

[73] Assignee: Zenith Electronics Corporation, Glenview, Ill.

[21] Appl. No.: 106,078

[22] Filed: Oct. 7, 1987

[51] Int. Cl.$^4$ .............................................. H04N 5/68
[52] U.S. Cl. ...................................... 358/243; 358/74; 358/184; 315/383
[58] Field of Search ................... 358/36, 37, 21 R, 223, 358/168, 167, 29, 243, 74, 184; 315/383

[56] References Cited

U.S. PATENT DOCUMENTS

| | | | |
|---|---|---|---|
| 4,164,758 | 8/1979 | Kowal | 358/167 |
| 4,340,910 | 7/1982 | Valdes | 358/243 |
| 4,370,674 | 1/1983 | Johnson | 358/29 X |
| 4,387,405 | 6/1983 | Hinn | 358/74 X |
| 4,639,285 | 1/1987 | Tallant, II et al. | 358/243 X |

Primary Examiner—James J. Groody
Assistant Examiner—Victor R. Kostak

[57] ABSTRACT

An RGB video output drive amplifier is provided with current limiting circuitry at the base of the driver circuit. In a preferred embodiment, the driver circuit comprises a drive transistor with associated biasing circuits. The base of the drive transistor is coupled to a current limiting circuit to shunt excess current from the base of the transistor and to block additional input current at or near the level representative of the driver transistor reaching its saturation mode. Excess current is dissipated through associated resistance in the base circuit and while diode means prevent high input signals from driving the drive transistor into saturation. Maintaining the drive transistor at or below its saturation level prevents flaring in the resulting video picture display. No appreciable storage charge is built up during the short periods which the drive transistor may enter saturation in response to rapid transients provided through a transient response circuit in parallel with the current limiting circuit. Detail in the resulting picture is optimized and minimal additional capacitance is added to the output circuitry.

10 Claims, 2 Drawing Sheets

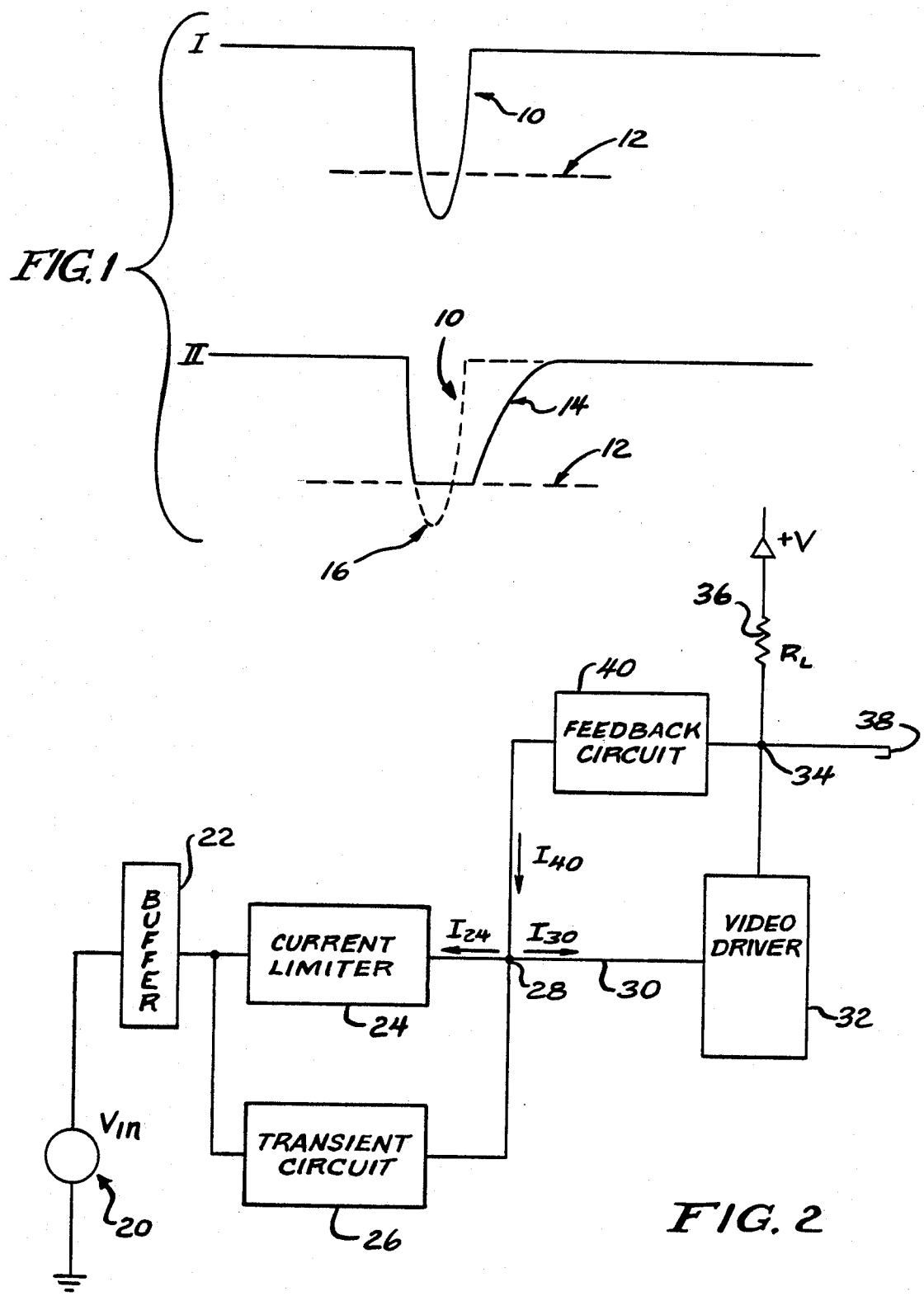

ANTI-FLARING VIDEO OUTPUT AMPLIFIER CIRCUIT AND TECHNIQUE

BACKGROUND OF THE INVENTION

The present invention generally relates to the television display art. More particularly, the present invention relates to display quality and control of associated video output stages for television displays.

Video output amplifiers typically utilize one or more drive transistors, which are responsive to video signals from a video source and provide high voltage output signals, to drive associated cathodes of an appropriate CRT display. Typical color televisions contain three channels—R, G and B—for providing color video signals. The three color channels form parallel processing networks, and each is identical to the others.

In some instances, the input video signal will be of a sufficient magnitude that it will drive a drive transistor within the video output amplifier for one or more of the three color channels into saturation. The resulting video output signal may be viewed on an oscilloscope which will show a clipping at the video signal peaks. Once a drive transistor enters saturation, a delay period will be introduced at the time when the video signal drops in magnitude below that required to drive the transistor into saturation. The storage charge within the transistor, which is built up when it is in saturation, creates this finite interval, which is required to dissipate the storage charge after the saturating, biasing signal is removed. As a result, the displayed video picture will exhibit flaring associated with the particular peak video signal. That is, bright objects, e.g., a human nose or ear in sunlight, a gold bracelet, waves in pool water, will become blurred in the direction of the raster scan as the video signal pulse representing that image will be spread (its termination delayed) by driving the driver transistor into and out of saturation.

A previous method for eliminating this visual distortion hard clamps the output voltage at the collector of the drive transistor, usually with a diode forward biased between a selected clamping voltage source and the drive transistor collector. This limits the output voltage to the level of the clamping voltage source (plus the negligible diode junction voltage drop) and prevents the drive transistor from going into saturation. However, it also limits detail in the resulting picture by limiting the video output signal level without regard to any characteristics of the input signal, except its magnitude.

Accordingly, a principal object of the present invention is to provide a circuit and a technique which generally overcomes the deficiencies of the prior art.

A more particular object of the present invention lies in providing circuitry and a technique for preventing flaring in displayed television pictures.

A further particular object lies in providing a circuit and technique for preventing flaring in displayed television pictures while maintaining picture detail and optimizing costs.

In accordance with the stated objects and other objects apparent from the following description, the present invention provides a current limiting circuit at the input to a video output driver circuit, such as a typical drive transistor. Feedback from the drive output controls the current into the drive circuit, and the current limiting circuit maintains the input level below that which would cause the drive transistor or other video output drive circuitry to go into saturation for undesirable time periods. Transient response circuitry in parallel with the current limiting circuit allows the output drive circuitry to respond to rapid swings in video input signals, without canceling the effects of the current limiting circuit. In this fashion, the displayed video picture does not exhibit flaring while maintaining a high level of detail.

BRIEF DESCRIPTION OF THE FIGURES

Features of the present invention which are deemed to be novel are set forth with particularity in the appended claims. The present invention, along with additional features, advantages and objects, may be more fully understood by reference to the following detailed description taken in conjunction with the accompanying drawings, of which:

FIG. 1 represents an example of a video input signal (I) and video output signal (II) which together illustrate the spread or delay phenomenon which causes flaring in the resulting picture on a video display;

FIG. 2 is a general block diagram representation of a preferred embodiment of a video output amplifier according to the present invention.

DETAILED DESCRIPTION OF THE PREFERRED EMBODIMENT

Figure 3:
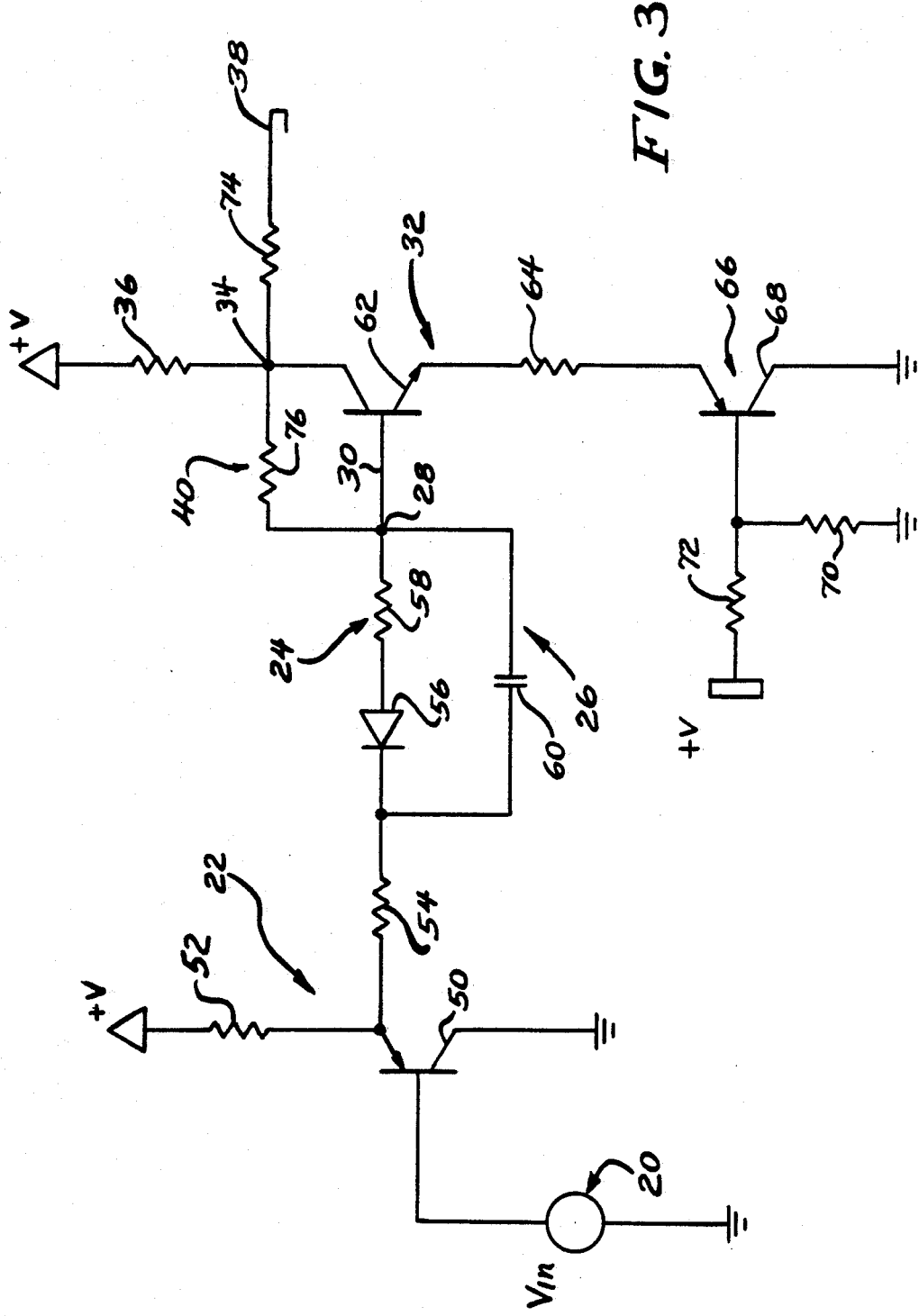
FIG. 3 is a detailed schematic diagram of a preferred embodiment of a video output amplifier in accordance with the present invention.

Referring now to FIG. 1, therein is shown illustrative waveforms exemplary of the condition known as flaring. Particularly, waveform I may represent an incoming video signal containing a pulse 10. This pulse 10 is greater in magnitude, by a significant amount, than a level 12 at which a drive transistor within a video output amplifier typically will go into saturation. The output of a typical video amplifier may then be shown by waveform II as a response to waveform I. As shown, an output pulse 14 in the video output signal of waveform II is clipped at or about the level 12. The output pulse 14 also is spread from the original pulse 10 (shown in dashed lines in waveform II) as its termination lags by a recognizable time period after the termination of the pulse 10. The storage charge associated with driving a drive transistor into saturation and the time required to dissipate that stored charge creates this noticeable lag in the output video signal. This same lag results in a spreading or flaring of high level video detail signals, such as high gloss human noses, on the display.

One solution to the problem has been to hard clamp the output at about the level 12 as described above. This results in an output waveform which approximately mirrors the input pulse 10, except that the portion greater in magnitude than the level 12 (shown by the dotted portion 16 in waveform II) will be clipped for each pulse. This results in a corresponding loss of the detail represented by the peak portion of the input pulse 10. More importantly, this detail level or percentage cannot be regained for signals which, although large in peak value, remain short in duration and do not build up appreciable storage charge in the output amplifier, even if they take one or more drive transistors into saturation.

Referring now to FIG. 2, therein is shown a general block diagram illustration of a video output amplifier for one color output channel (R, G or B) in accordance with the present invention. More particularly, a video signal input source 20 provides video input signals to a buffer 22. The buffer 22 passes (and may amplify) the video signals to a current limiter circuit 24 and to a transient response circuit 26. The outputs of the circuits 24 and 26 combine at a node 28 to provide input signals via a line 30 to a video driver circuit 32. The video driver circuit 32 generates output video signals at a node 34 in conjunction with a load resistor 36 coupled to a voltage source. The video output signals on the node 34 communicate to one of the R, G or B cathodes, such as a cathode 38 illustrated in FIG. 2. The video output signals at node 34 also communicate through a feedback circuit 40 to the node 28 at the input to the video driver circuit 32.

In operation, the circuit of FIG. 2 provides a high voltage video output signal to the associated cathode 38. The gain of the video driver circuit 32 may be controlled by selection of the appropriate value for the load resistor 36 or by other conventional means. Identical circuits are typically provided for each of the R, G and B channels. FIG. 2 illustrates only one such channel solely for exemplary purposes.

The feedback circuit 40 provides feedback information from the node 34 to the node 28 as shown as a current $I_{40}$. In operation of the video driver circuit 32, the node 34 typically will be at a higher voltage than the node 28, which will provide a positive current flow ($I_{40}$) to the node 28 from the feedback circuit 40. This current then may be supplied via the line 30 to the video driver circuit 32, as shown by a current $I_{30}$, or may flow in part to the current limiter circuit 24, as shown by a current $I_{24}$.

However, if the video driver circuit 32, with any associated drive transistors, receives an input voltage level on line 30 which would drive the transistors therein into saturation, then the current limiter circuit 24 blocks the associated excess current. In other situations, the current limiter 24 provides an alternate path for current from the feedback circuit 40. That is, the current limiter circuit 24 responds to the feedback information provided, in this case a current, from the feedback circuit 40 and to the input signal level to limit the current $I_{30}$ from the node 28 into the video driver circuit 32 via the line 30. In the case of an input signal level above the saturation level of the driver circuit 32 for a recognizable interval, the feedback current $I_{40}$ will become equal to the current $I_{30}$ flowing to the video driver circuit 32. This presents saturation at the video driver.

The transient response circuit 26, connected in parallel with the current limiter circuit 24, provides for transient response. That is, when the input video signal from the video signal source 20 undergoes a rapid transition, or swing in magnitude, the transient response circuit 26 provides a rapid indication of that signal swing to the node 28 to allow the video driver circuit 32 to react equally promptly. In this fashion, the high voltage output at the cathode 38 will mirror the video input signal from the source 20 as close as possible, although the current limiter circuit 24 will prevent the video driver circuit 32 from entering into a saturation mode for any significant period of time. At or about the saturation level, the current limiter circuit 24 will block additional current to node 28 from the input signal and keep it away from the video driver circuit 32, while maintaining the video signal waveform as nearly as possible. In contrast, the transient response circuit 26 provides for rapid responses and effectively bypasses the current limiting circuit for short term events typified by video pulse initiation and termination. This provides, for example, the rapid rise and fall times required for square waveforms and high detail.

The provision of rapid response at the node 28 to variations in the input signal received from the video source 20 may provide for high transient currents which would drive transistors within the video driver circuit 32 into saturation. However, the very nature of the transient currents will ensure that the current to the video driver circuit 32 does not endure for a sufficient period to develop significant storage charge within the video driver circuit 32, even though one or more transistors may be driven briefly into saturation. Thus, the output signal at the cathode 38 will approximate the input signal from the video driver circuit 32, even though a slight clipping may occur at about the saturation level of the transistors within the video driver circuit 32. This maintains high detail percentage as not all signals above the saturation level are clipped.

Referring now to FIG. 3, therein is shown a detailed schematic diagram of a video output amplifier for one color channel (R, G, or B) in accordance with the teachings of the present invention. The video amplifier elements shown in FIG. 3 are similar to or the same as those illustrated in FIG. 2. Specifically, video output signals are received from a video input source 20 at a buffer circuit 22. In this embodiment, the buffer circuit 22 comprises a grounded collector, PNP transistor 50 in conjunction with a resistor 52 coupled at its emitter to a voltage source to provide a desired buffer and gain function for the original input video signal received at its base.

The output of the circuit 22 communicates with the current limiter circuit 24, which in the embodiment of FIG. 3 comprises a first resistor 54, a diode 56 and a second resistor 58. The output of the circuit 22 also communicates with the transient response circuit 26, which in the embodiment of FIG. 3 comprises a single capacitor 60.

The output of the current limiter circuit 24 and the transient response circuit 26 combine at the node 28, which communicates via a line 30 to provide input signals at the base of an NPN transistor 62. The transistor 62 represents a drive transistor within the video driver circuit 32, which further comprises an emitter resistor 64 and a black level bias circuit 66.

The black level bias circuit 66 comprises a PNP transistor 68 with biasing resistors 70 and 72. The biasing resistor 72 communicates with an appropriate voltage source to provide the desired black level biasing for the video driver circuit 32 by controlling the baseline voltage level at the emitter of the drive transistor 62 through the resister 64.

The output of the video driver circuit 32 at the collector of the transistor 62 at the node 34 communicates via a resistor 74 to the high voltage cathode 38. Likewise, the signal at the node 34 may be fed back via the feedback circuit 40 to the node 28. In the embodiment of FIG. 3, the feedback circuit 40 comprises a single resistor 76.

More particularly, the drive transistor 62 functions as is well known in the art for a video output amplifier. In contrast to other prior art methods which have attempted to limit the voltage at node 34 to keep transistor 62 from saturating, the present invention provides a current limiting circuit 24 at the base of the drive transistor 62. In the embodiment of FIG. 3, a feedback current (shown as $I_{40}$ in FIG. 2) flows through the resistor 76 whenever the voltage of the collector of the transistor 62 at node 34 exceeds the voltage at the base of the transistor 62 at the node 28. Whenever that condition is true, the diode 56 in the current limiter circuit 24 is biased on. Thus, current flowing to node 28 from the feedback resistor 76 will flow in part through the diode 56 and be dissipated by the resister 58 and the resister 54. In this fashion, the diode 56 and the resistor 58 and the resistor 54 limit the current which may flow to the drive transistor 62 during normal operation. However, the peak output voltage at the node 34 at the collector of the drive transistor 62 is not directly regulated.

Also, the current limiter circuit 24 comprising the first resistor 54, the diode 56 and the resistor 58 prevents excess current from flowing through the node 28 to the drive transistor 62 when the input signal exceeds a level sufficient to drive the transistor 62 into saturation. The diode 56 becomes reverse biased when the input signal at the junction of the resistor 52 and the emitter of the transistor 50 becomes sufficiently higher than the signal at node 28. This action blocks additional current flow into the node 28 and hence into the base of the drive transistor 62. The signal level at which the diode 56 becomes reverse biased may be determined to match the operating characteristics of the drive transistor 62 by selection of the values for the resistors 54 and 58.

The drive transistor 62 will go into saturation only when a large, instantaneous current swing is transmitted by the capacitor 60 to the node 28. However, this can be only a transient current because of the nature of the capacitor 60 which blocks the D.C. current component. The drive transistor 62, accordingly, will build up no appreciable charge during such time that it may be in saturation. In this fashion, the output voltage at the collector of the drive transistor 62 at the node 34 will represent a high voltage mirror image of the input video signal received from the video source 20, although at large transient pulses, the peak of the pulse may be clipped by the drive transistor 62 entering its saturation mode. Likewise, video signals of appreciable duration having a magnitude sufficient to drive the output amplifier into saturation also will be clipped.

It should be recognized that the capacitor 60 provides the instantaneous high currents required for fast rise and fast fall times when square waveforms or video pulse signals are provided by the video input source 20. Without the capacitor 60, the response time of the video amplifier would be undesirably slow. In such a situation, the drive transistor 62 would be driven solely by the current through the feedback resistor 76, hence increasing the response time.

The present invention provides a current limiting circuit at the base of the drive transistor or at the input to a video output drive circuit. This does not unnecessarily or undesirably increase the capacitance in the output circuit which would result in slower response times. In this fashion, flaring may be prevented on the display screen by keeping the drive transistor from entering its saturation mode except in response to very high transient signals. Likewise, the discharge time for the storage charge of the drive transistor in saturation is not traded off against the discharge time caused by an alternate increase in capacitance in the output circuitry. Rather, the current to the drive circuitry is limited in response to the voltage differential between the input and output of the video drive circuit. The excess current is dissipated by the resistors in the base circuit, namely resistor 58 and resistor 54. Due to the reverse biasing of the diode 56 away from the base of the drive transistor 62, excess current may not flow back into the base of the video drive circuit and unduly high level input signals are blocked to prevent saturation in the drive circuitry.

It should be appreciated then that the present invention provides an anti-flaring circuit and technique. In the disclosed embodiments of the present invention, the percentage of detail in the resulting output signal will be optimized as the video output voltage is not arbitrarily clamped but rather mirrors the input signal until such time as the voltage differential between the input and output of the video driver circuit indicates that excess current is being generated and the drive transistor or other drive circuitry is approaching a saturation mode. Additionally, the present invention provides for circuit embodiments which add no capacitive load on the output. Hence, no trade-off is made between additional storage charge and response time as explained above. Also, no trade-off is made between flaring and response time, again optimizing detail in the resulting picture. Further, cost is optimized in that the present anti-flaring circuitry and technique requires the addition of a simple component (the diode 56 in the preferred embodiment) in the base circuitry for the video drive circuit. It should be remembered that the video output amplifiers as shown in FIGS. 2 and 3 represent but one of three parallel channels required for the R, G and B processing in a color television receiver. Each channel is envisioned as being identical to the others.

Although described above in terms of a number of preferred embodiments, the present invention is set forth with particularity in the appended claims. Such modifications and alterations as would be apparent to one of ordinary skill in the art and familiar with the teachings of the present application should be deemed to fall within the spirit and scope of this invention. Interconnections between the described circuitry and other portions of a television receiver or monitor is deemed to be within the scope of any technician knowledgeable in the television display art.

What I claim is:

1. Video display apparatus comprising:
video driver means having an input for receiving video signals and an output at which a video drive signal is presented and feedback provided between said input and output;
current limiting means, comprising at least one junction diode reversed biased with respect to said video driver means, coupled between said input and said video signal source and responsive to said feedback means and said received video signals to limit the signal level at the input of said driver means; and
transient response means coupled in parallel with said current limiting means to provide response to transients in said input signal from said video signal source.

2. The video display apparatus of claim 1 wherein said transient response means comprises a capacitor coupled in parallel with said current limiting means.

3. In a RGB video display system adapted to receive video input signals from a video signal source and to generate video drive signals and having feedback between said output and said input, circuitry for inhibiting flaring in the displayed picture comprising:
current limiting means, intermediate said video input signal and said corresponding driver circuit in at least one color video channel, responsive to said feedback and said input signals to limit the level of the signal at the input to said driver means; and transient transmission means coupled in parallel with said current limiting means to provide rapid response to abrupt transitions in said input signals.

4. The RGB video display system of claim 3 wherein said current limiting means comprises diode means in series with resistor means.

5. The RGB video display system of claim 4 wherein said diode means comprises at least one junction diode reverse biased with respect to said driver circuit.

6. The RGB video display system of claim 3 wherein said transient transmission means comprises capacitor means coupled in parallel with said current limiting means.

7. An RGB video drive circuit, comprising in combination:

output driver means for generating output video signals;

feedback means coupled to said driver means to provide feedback from said output signals;

gain control means coupled in series with said driver means to control the gain of said driver means;

buffer means adapted to receive input video signals;

resistance means coupled between said buffer means and said driver means to provide input signals to said driver means;

current control means coupled in series with said resistance means and responsive to said feedback means and said input signals to control the current to said driver means to maintain the bias of said driver means below its saturation level; and transient response means coupled in parallel with said current control means.

8. The RGB video drive circuit of claim 7 wherein said current control means comprises diode means.

9. The RGB video drive circuit of claim 8 wherein said diode means comprises at least one junction diode, reverse biased with respect to said driver means.

10. The RGB video drive circuit of claim 8 wherein said transient response means comprises a capacitor coupled in parallel with said diode means.

* * * * *